(12) United States Patent
Sullivan (10) Patent No.: US 6,781,096 B2
(45) Date of Patent: Aug. 24, 2004

(54) APPARATUS AND METHOD FOR PATTERN-BASED CONTROL OF A SYSTEM

(75) Inventor: Gary Dale Sullivan, Arvada, CO (US)

(73) Assignee: Matrix Innovations, LLC, Denver, CO (US)

(*) Notice: Subject to any disclaimer, the term of this patent is extended or adjusted under 35 U.S.C. 154(b) by 40 days.

(21) Appl. No.: 10/215,425

(22) Filed: Aug. 9, 2002

(65) Prior Publication Data

US 2004/0026407 A1 Feb. 12, 2004

(51) Int. Cl.$^7$ ................................................ H05B 1/02
(52) U.S. Cl. ...................................... 219/492; 219/490
(58) Field of Search ................................ 219/482, 490, 219/492, 494, 501, 508, 509, 510, 497; 311/11, 18, 44; 702/84, 181, 182, 184

(56) References Cited

U.S. PATENT DOCUMENTS

| | | | | |
|---|---|---|---|---|
| 4,740,664 A | * | 4/1988 | Payne et al. ................. | 219/494 |
| 5,079,407 A | * | 1/1992 | Baker .......................... | 219/492 |
| 5,870,001 A | * | 2/1999 | Osterling et al. ............ | 331/11 |
| 6,384,384 B1 | * | 5/2002 | Connolly et al. ............ | 219/497 |
| 6,622,101 B1 | * | 9/2003 | Oechsner et al. ............ | 702/182 |

OTHER PUBLICATIONS

Stephen Wolfram, "A New Kind of Science," Wolfram Media, Inc., 2002, Chapter 9, pp. 473, 476, 526, Notes for Chapter 2, p. 869.

* cited by examiner

Primary Examiner—Tu Hoang
(74) Attorney, Agent, or Firm—Merchant & Gould P.C.

(57) ABSTRACT

A generic, self-tuning control system deployable in a wide variety of systems is achieved from a digital system effectuating a matrix chain. Each matrix in the chain yields an output based upon two or more inputs. The outputs of the various matrices making up the chain are used as inputs to other matrices in the chain. Measured inputs are state variables of the system under control. Some inputs that are generated by other matrices are state variables. Consequently, the set of values generated by the matrices results from the state variables describing the system at a given point in time. Initially, the matrices exhibit a quality referred to as symmetry. This quality serves to cause the system under control to transition to desired state. In addition to the controlling force exerted by virtue of the symmetry of the matrices, a learning algorithm may be introduced to the matrix chain. The learning algorithm strategically introduces asymmetries into one or more matrices, so as to cause the matrix chain to better reflect the dynamics of the system it is controlling.

43 Claims, 8 Drawing Sheets

APPARATUS AND METHOD FOR PATTERN-BASED CONTROL OF A SYSTEM

TECHNICAL FIELD

The invention relates generally to a method and apparatus for implementing a discrete-time control system, and more specifically to an apparatus and method for implementing a pattern-based control system implemented via matrix chains.

BACKGROUND

Almost all control systems require that they be tuned in light of the system in which they are to be deployed. To illustrate, consider the most frequently used control system, the proportional-integral-derivative controller ("PID controller"). A PID controller generates a control variable based upon the difference between a user-defined set point and a measured process variable. This difference is referred to as "the error." The control variable is typically converted into a signal that is used to drive a control device that influences the process variable.

A PID controller calculates its control variable by summing together three quantities: (1) the error multiplied by a first gain factor, $K_p$; (2) the integral of the error multiplied by a second gain factor, $K_i$; and (3) the derivative of the error multiplied by a third gain factor, $K_d$. The process of selecting the gain factors, $K_p$, $K_i$, and $K_d$, (referred to as "tuning" a PID controller) is a matter that influences how well the control system behaves. If a PID controller is not tuned properly, the process variable may be slow to arrive at the user-defined set point. Additionally, an untuned PID controller may produce undesirable results such as causing the process variable to oscillate excessively about the set point, causing the process variable to exhibit a steady-state error, or causing the process variable to become unstable.

The process of optimally tuning a PID controller is mathematically complex, and requires a great deal of field testing to ensure that the chosen gain factors cause the control system to function properly. In short, the process is expensive and time consuming.

The above-discussed problem regarding the need to tune a control system to function properly with the system in which it is deployed is common to almost all forms of control systems. Thus, as is made evident by the foregoing discussion, a need exists for a generic, self-tuning control system that can be deployed in wide variety of systems. A desirable embodiment of such a control system will be capable of learning to tune itself based upon its interaction with the system it is controlling.

SUMMARY OF THE INVENTION

Against this backdrop, the present invention has been developed. A method of controlling a system having a plurality of state variables, so as to drive a process variable to a set point, may be arrived at by execution of the following steps. Initially, a matrix chain comprised of a plurality of matrices, including a first matrix, at least one intermediate matrix, and a last matrix is established. Each matrix generates an output based upon a plurality of inputs. The inputs for the first matrix are state variables. For the at least one intermediate matrix, one input is the output from another matrix and another input is either a state variable or the output from another matrix. For the last matrix, at least one input is the output from another matrix, and the output of the last matrix is used to drive a control device that influences the process variable. The output is further used as an input to either the first matrix or one of the at least one intermediate matrices. The matrix chain initially exhibits a systemic degree of reflectivity that is a multiple of 360°. Throughout the duration of controlling the system, the state variables are input to the set of matrices. Finally, throughout the duration of controlling the system, the control device is driven with the output of the last matrix.

According to another embodiment of the invention, a processor is programmed to execute the above-described steps.

According to yet another embodiment of the invention, a method of controlling a system having a plurality of state variables, so as to drive a process variable to a set point, may be achieved by detecting the state variables of the system. Thereafter, the set of state variables are input to a matrix chain. The matrix chain is comprised of a plurality of matrices in which an output from one matrix in the chain is an input to a second matrix in the chain. At least one of the matrices initially exhibits symmetry. At least one matrix feeds its output to a rearward matrix of the matrix chain. A control device that influences the process variable is driven with the output of a matrix.

According to yet another embodiment of the invention, a processor is programmed to execute the above-described steps.

According to yet another embodiment of the invention, an application specific integrated circuit is arranged and configured to effectuate the above-described steps.

DETAILED DESCRIPTION

A generic, self-tuning control system deployable in a wide variety of systems can be achieved from a digital system effectuating a matrix chain. Each matrix in the chain yields an output based upon two or more inputs. For example, a two-dimensional array (an array in which a value is looked up based upon two index variables) may be considered a matrix. The outputs of the various matrices making up the chain are used as inputs to other matrices in the chain. Thus, each matrix can have two sorts of inputs: (1) an input that is actually an output generated by another matrix; or (2) an input that is a measured quantity from the system under control. The inputs that are measured quantities are state variables of the system under control. Likewise, some inputs that are generated by other matrices are state variables. As a consequence, the set of values generated by the matrices results from the state variables describing the system at a given point in time. Initially, the matrices exhibit a quality referred to as symmetry. This quality serves to cause the system under control to transition to desired state (i.e., to a particular set point or more than one set points). In addition to the controlling force exerted by virtue of the symmetry of the matrices, a learning algorithm may be introduced to the matrix chain. The learning algorithm strategically introduces asymmetries into one or more matrices, so as to cause the matrix chain to better reflect the dynamics of the system it is controlling.

The above-described matrix chain system will be discussed in greater detail below. One skilled in the art understands that the schemes discussed herein are susceptible of embodiment in any digital system architecture. For example, the matrix chain systems presented herein may be embodied as software or firmware stored in a memory device and used to program a processing unit. Alternatively, the matrix chain systems may be embodied as a set of logic gates and associated circuitry making up an application-specific integrated circuit (ASIC). Still further, the matrix chain systems may be embodied by one or more programmable gate arrays cooperating to implement the schemes presented herein.

Figure 1A:
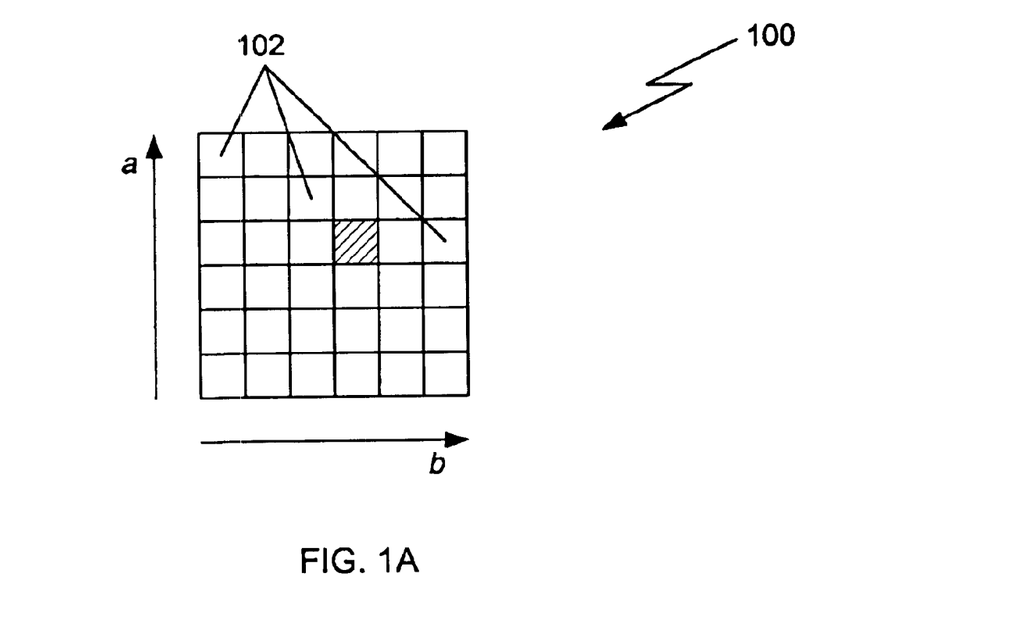
FIG. 1A is a depiction of a two-dimensional matrix that is capable of use within a matrix chain system.

FIG. 1A is a depiction of a two-dimensional matrix 100 that is capable of use within the matrix chain systems discussed herein (below). The matrix 100 of FIG. 1A is defined by two axes, labeled a and b. Each axis may also be referred to as an index variable. In the example shown, each of the two axes (a and b), can take on a value between 1 and 6. Each combination of values for a and b corresponds to a unique cell (some of which are identified by reference numeral 102), which holds a value. For example, the cell corresponding to a=4 and b=4 is identified by cross-hatching. The values stored in the cells 102 making up the matrix 100 may or may not correspond to the legal value range for each index variable (in the case of a and b, 1–6).

One skilled in the art understands that the two-dimensional matrix 100 depicted in FIG. 1A may be embodied as a set of values stored as a two-dimensional array in a memory device, such as a random access memory or a read-only memory. Alternatively, the matrix 100 may be embodied as a set of logic gates (as in an ASIC) arranged so as to yield a value corresponding to a particular combination of index variables. Still further, the matrix 100 may be embodied as a function that calculates the value of each cell based upon an algorithm that uses the index variables, a and b, as arguments.

Figure 1B:
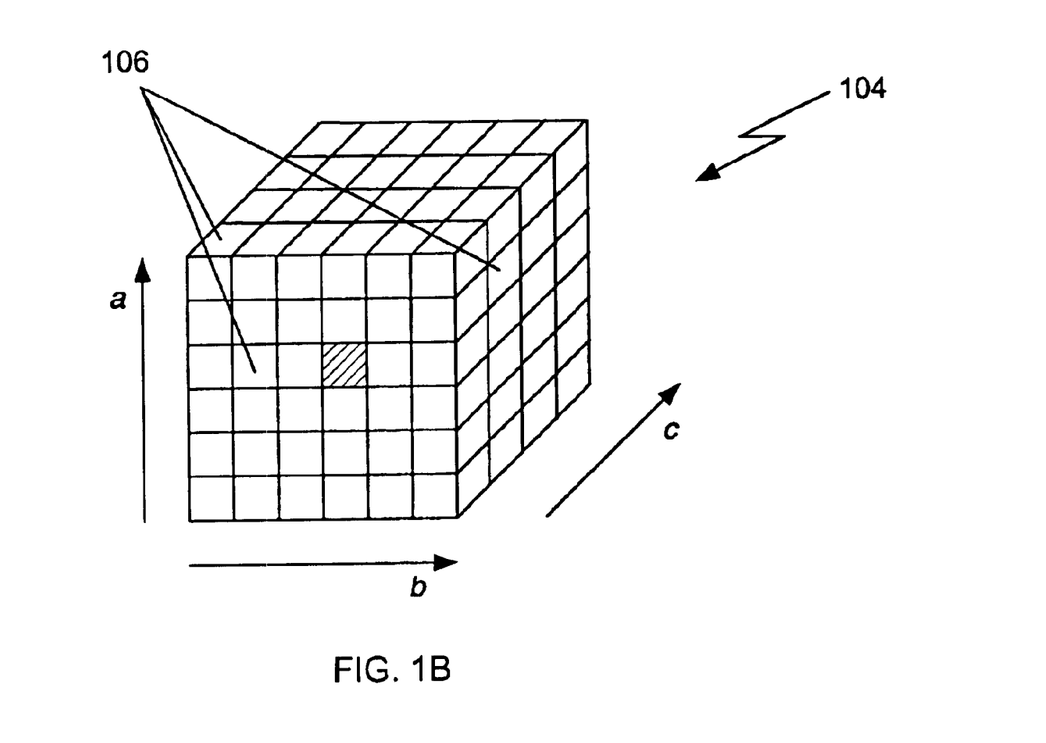
FIG. 1B is a depiction of a three-dimensional matrix that is capable of use within a matrix chain system.

Although the matrix chain systems discussed herein (below) are composed of two-dimensional arrays, a matrix chain system may be composed of matrices of any dimension. An example of a three-dimensional matrix 104 is depicted in FIG. 1B. The matrix 104 of FIG. 1B is defined by three axes (or index variables), labeled a, b, and c. In the example shown, axes a and b can take on a value between 1 and 6, while axis c is permitted values ranging between 1 and 4. In a manner analogous to the two-dimensional matrix 100 of FIG. 1A, each combination of values for a, b, and c corresponds to a unique cell (some of which are identified by reference numeral 106), which holds a value. For example, the cell corresponding to a=4, b=4, and c=1 is identified by cross-hatching. As was the case with the two-dimensional matrix 100, the values stored in the cells 106 making up the matrix 104 may or may not correspond to the legal value range for each index variable. A three-dimensional matrix 104 is susceptible of embodiment in all of the same ways that a two-dimensional matrix 100 may be embodied. Similarly, an n-dimensional matrix may be embodied in all of the same ways that a two-dimensional matrix 100 may be embodied.

The discussion with respect to FIGS. 2A–2F focuses on concepts regarding matrices that are embedded within the control system structure disclosed herein. The discussion with respect to the remaining figures focuses upon the control system structure, itself.

FIGS. 2A–2F depict various exemplary two-dimensional matrices. The matrices of FIGS. 2A–2F are 7×7 and contain cell values ranging from 1 to 7. As commented upon with reference to FIGS. 1A and 1B, a matrix may be of any number of dimensions, its index variables may take on any range of values, and its cell values may take on any range. The particulars with respect to matrix dimension, index variable range, and cell value range for the matrices of FIGS. 2A–2F have been chosen for the sake of presenting certain concepts regarding the matrices. The particulars do not reflect design constraints of matrices that may be used in the control systems disclosed herein.

Figure 2A:
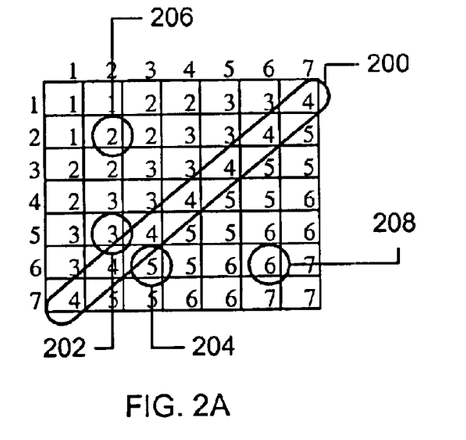
FIG. 2A is a depiction of a two-dimensional, flat, symmetric matrix with a 360° degree of reflectivity.

The matrix depicted in FIG. 2A exhibits three noteworthy characteristics: (1) it has an axis of symmetry that is oriented at 360°; (2) it is symmetric; and (3) it is flat. The axis of symmetry of the matrix depicted in FIG. 2A is circled and identified by reference numeral 200. The axis of symmetry 200 exhibits a property whereby any two cells on opposite sides of, and equidistant from, a point on the axis 200 have a constant sum, if the cells lay along a single vector running normal to the axis 200. For example, cells 202 and 204 are on opposite sides of the axis 200 and are equidistant therefrom. They also lay along a single vector that is normal to the axis. The sum of the values of cells 202 and 204 is 8 (3+5=8). Similarly, cells 206 and 208 are on opposite sides of the axis 200 and are equidistant therefrom. They, too, lay along a single vector that is normal to the axis 200. The sum of the values of cells 206 and 208 is also 8 (2+6=8). Thus, for the matrix depicted in FIG. 2A, the values stored in any two of cells will have a sum of 8 if they are on opposite sides of the axis of symmetry 200, are equidistant therefrom, and lay along a single vector normal to the axis 200. A matrix (such as the matrix depicted in FIG. 2A) that has an axis of symmetry (such as 200) is referred to as being "symmetric."

A cell value represents the tendency of the control system in which the matrix is embedded to force the process variable toward the set point. For example, a cell value of "1" may represent the tendency of the system to exert maximal force to influence the process variable to rise to meet the set point, while a value of "7" may represent the tendency of the system to exert maximal force to influence the process variable to fall to meet the set point. Proceeding forward with this example, a cell value of "2" would represent the tendency of the control system to exert slightly less than maximal force to influence the process variable to rise to meet the set point.

A matrix is regarded as being "flat" if the cell values therein vary directly with their distance from the symmetric axis. Thus, with respect to the matrix depicted in FIG. 2A, it can be said that it is flat, because the cell values therein increase/decrease uniformly as a function of their distance from the axis 200. It follows, then, that a flat matrix causes a tendency in the control system to increase the force with which the process variable is propelled toward the set point in direct proportion to the distance between a cell and the axis of symmetry.

Previously, it was noted that the axis of symmetry of the matrix depicted in FIG. 2A is oriented at 360°. The orientation of the axis of symmetry may be referred to as the "degree of reflectivity." Accordingly, the matrix of FIG. 2A may be said to possess a degree of reflectivity of 360°. This description of the orientation is a consequence of convention. The degree of reflectivity of a matrix decreases as the axis of symmetry is rotated in the counterclockwise direction, and increases as it is rotated in the clockwise direction.

Figure 2B:
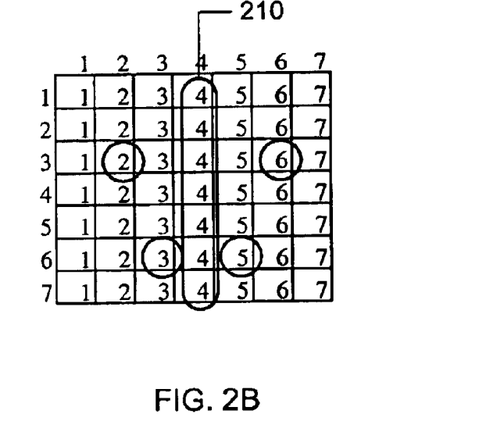
FIG. 2B is a depiction of a two-dimensional, flat, symmetric matrix with a 270° degree of reflectivity.

FIG. 2B depicts a flat, symmetric matrix with an axis of symmetry 210 oriented at 270°. As can be seen by comparing the axis 200 of FIG. 2A with the axis of FIG. 2B, the axis 210 of FIG. 2B is rotated 90° (in the counterclockwise direction) from the axis 200 of FIG. 2A. Thus, per convention, the degree of reflectivity is described as 270° (360°-90°=270°). Like the matrix of FIG. 2A, the matrix of FIG. 2B is symmetric, in that any two cells on opposite sides of, and equidistant from, a point on the axis 210 have a constant sum, if the cells lay along a single vector running normal to the axis 210. Also like the matrix of FIG. 2A, the matrix of FIG. 2B is flat, in that the cell values therein vary directly with their distance from the symmetric matrix 210.

Figure 2C:
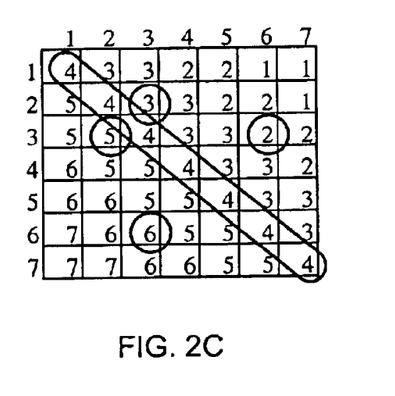
FIG. 2C is a depiction of a two-dimensional, flat, symmetric matrix with a 180° degree of reflectivity.
Figure 2D:
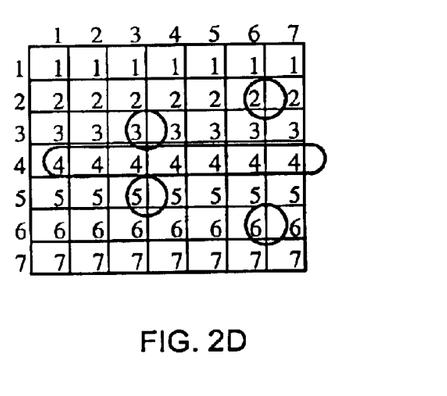
FIG. 2D is a depiction of a two-dimensional, flat, symmetric matrix with a 90° degree of reflectivity.

FIGS. 2C and 2D depict flat, symmetric matrices with degrees of reflectivity of 180 and 90°, respectively, and therefore possess the same characteristics as exhibited by the matrices of FIGS. 2A and 2B.

Figure 2E:
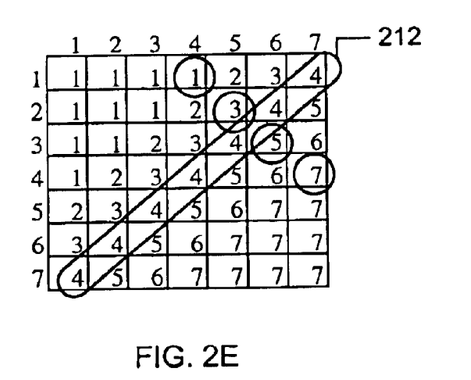
FIG. 2E is a depiction of a two-dimensional, curved, symmetric matrix with a 360° degree of reflectivity.

FIG. 2E depicts a curved symmetric matrix with a 360° degree of reflectivity. As is the case with the matrices of FIGS. 2A–2D, any two cells on opposite sides of, and equidistant from, a point on the axis of symmetry 212 of the matrix in FIG. 2E have a constant sum, if the cells lay along a single vector running normal to the axis 200 (5+3=8; and 7+1=8). However, unlike the matrices of FIGS. 2A–2D, the matrix of FIG. 2E is curved. That this is the case can be verified by simple observance of the fact that the cell values therein do not vary directly with their distance from the symmetric matrix 212. For example, the cell value at <1,6> is "3." Moving one cell leftward, at <1,5>, the value is "2." However, the remaining cell values in row 1 are "1," meaning that cell values do not continue to decrease in row 1, even as the column value becomes more remote from the axis 212. Thus, the matrix of FIG. 2E is curved in such a way as to cause a tendency in the control system in which it is embedded to exert a great deal of force upon the process variable when a selected cell is located only a small distance from the axis of symmetry 212.

Figure 2F:
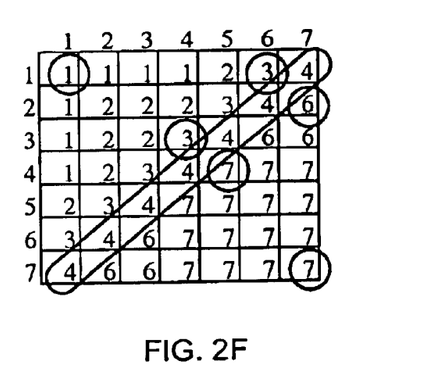
FIG. 2F is a depiction of a two-dimensional asymmetric matrix.

FIG. 2F depicts an asymmetric matrix. The matrix of FIG. 2F is asymmetric because no symmetric axis exists. To illustrate, a proposed axis 214 is identified in the asymmetric axis. However, it cannot be said that any two cells on opposite sides of, and equidistant from, a point on the the proposed axis 214 have a constant sum, if the cells lay along a single vector running normal to the axis 214. For example, the cell values at <1,6> and <2,7> have a sum of 9, while the cell values at <3,4> and <4,5> have a sum of 10. As a consequence of the asymmetry of a matrix, no simple formula describes the relationship between a set of cell values and a proposed axis (such as 214). As will be discussed later, a properly constructed asymmetric matrix may be required for tailoring a control system to the particular system in which it is deployed.

Figure 3A:
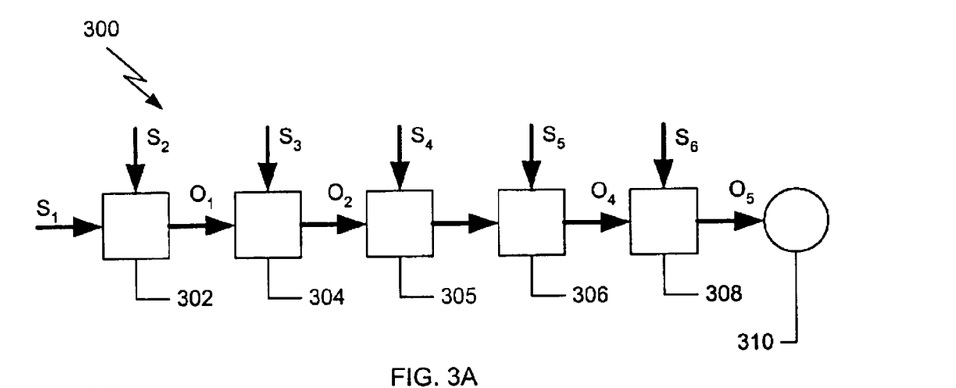
FIG. 3A is a depiction of a matrix-based control system, in accordance with one embodiment of the invention.

FIG. 3A depicts a simple control system 300 devised from matrices 302–306 that exhibits one or more of the characteristics described with reference to FIGS. 2A–2F. As can be seen, the control system 300 is driven by six inputs, $S_1$–$S_6$. Each input $S_1$–$S_6$ is a state variable of a hypothetical system under control. Accordingly, the control system 300 has as many inputs (six) as it does state variables (six). If the hypothetical system under control had eight state variables, then the control system 300 would utilize eight inputs. Thus, the structure of the control system 300 varies based upon the assumption regarding the number of state variables describing the system under control.

The control system 300 of FIG. 3A is a discrete-time system, meaning that it operates on the basis of measuring state variables during a present interval of time (referred to as time t=0) and generating an output for a subsequent interval of time (referred to as time t=1). For example, during the time interval t=0, state variables $S_1$ and $S_2$ are measured, and are used as inputs to index into matrix 302 (referred to as a "first matrix"), which generates an output $O_1$. Output $O_1$ is generated at time t=⅕. Output $O_1$ and state variable $S_3$ are, in turn, used as inputs to matrix 304, which generates an output $O_2$ (at time t=⅖). This cascading effect of using the output from one matrix as an input to a subsequent matrix is adhered to by matrices 304, 305, and 306 ("the intermediate matrices"). Finally, matrix 308 ("the last matrix") generates an output $O_5$ based upon state variable $S_6$ and output $O_4$. Output $O_5$ is fed to a control device 310 that uses the output $O_5$ to generate a signal, during time t=1, to influence the process variable.

To more firmly settle in the reader's mind concepts underlying matrix-based control, the remaining discussion with respect to FIG. 3A–FIG. 7 describes a matrix-based control system used to turn a heating coil in an oven on or off, so as to keep the temperature of the oven as close to a set point as possible. Such an application serves the purpose of illustration only. The invention disclosed herein is in no way limited to such an application. Rather, the invention disclosed herein is susceptible of use in any setting in which a control system is used.

Proceeding with the example whereby the control system 300 is used for turning an oven's heating element on or off, the first step for construction of the control system 300 is to determine the set of state variables governing the oven's temperature.

A reasonable estimation of an oven's state variables is shown in Table 1, below:

TABLE 1

| Input | State Variable |
| --- | --- |
| $S_1$ | Oven temperature at time t = 0 |
| $S_2$ | Oven set point at time t = 0 |
| $S_3$ | Output at time t = 0 |
| $S_4$ | Oven temperature at time t = −1 |
| $S_5$ | Oven set point at time t = −1 |
| $S_6$ | Output at time t = −1 |

As can be seen from Table 1, state variables $S_1$–$S_3$ are identified as being measured at time t=0, while state variables $S_4$–$S_6$ are identified as having been measured at time t=−1. Thus, the exemplary control system 300 operates based upon the hypothesis that a determination of whether or not the heating element should be turned on or off during a subsequent time interval can be made based upon knowledge of: (1) the present oven temperature $S_1$; (2) the present set point $S_2$; (3) the present output $S_3$; (4) the oven temperature during the preceding time interval $S_4$; (5) the set point during the preceding time interval $S_5$; and (6) the output during the preceding time interval $S_6$.

A generic control system 300 can be constructed based upon knowledge of the state variables $S_1$–$S_6$. Once the state variables $S_1$–$S_6$ are identified, a generic control circuit generally structured as shown in FIG. 3A will serve to drive the oven temperature (process variable) to a desired temperature (set point) if the control system is constructed in accordance with certain rules: (1) each state variable $S_1$–$S_6$ must be used as an input into the control system at least once; (2), each matrix in the matrix chain should be symmetric, and (3) the systemic degree of reflectivity of a matrix chain segment must be a multiple of 360°.

Another heretofore undiscussed design constraint involves the number of symbols into which the process variable (e.g., oven temperature) is mapped. The number of symbols into which the process variable is mapped, N, is related to the time delay of the control system, $T_{system}$, and the time constant, $T_p$, of the process being controlled. The relationship between the three variables should be:

$$T_p \geq T_{system} \geq T_p/N$$

The time delay, $T_{system}$, of the control system is the time required for an input into a first matrix to generate an output from the last matrix. $T_p$ is the time constant of the process being controlled when regarded as behaving in accordance with the following exponential relationship:

$$P(x)=x[e^{t/TP}]$$

Adherence to the above-stated relationship ensures that the neither the set point nor the process variable (oven temperature) is erroneously regarded as a constant, and further ensures that information regarding the set point and process variable is not lost.

To gain a better understanding of the third requirement, the terms "matrix chain segment" and "systemic degree of reflectivity" should be described. A matrix chain segment is a set of linked matrices, beginning with a first matrix (a matrix, such as matrix 302, that has state variables used as each of its inputs) and ending with a final matrix (a matrix, such as matrix 308, that feeds its output to a control device 310). For example, looking at control system 300, it possesses only one matrix chain segment, which is composed of matrices 302–308. The control system 300 has but one matrix chain segment, because it has only a single first matrix 302 and only a single last matrix 308, meaning that there exists only one set of linked matrices that begins with a first matrix and ends with a last matrix. Other control structures may have more than one first matrix or more than one last matrix, meaning that there would be more than one matrix chain segment defined by the control system.

Previously, with respect to the discussion regarding FIGS. 2A–2F, the degree of reflectivity of a single matrix had been discussed. The systemic degree of reflectivity of a matrix chain segment is found by summing together the degree of reflectivity of each matrix composing a matrix chain segment. Thus, for example, the systemic degree of reflectivity of the control system 300 of FIG. 3A is equal to the sum of the degrees reflectivity of matrices 302, 304, 305, 306, and 308. According to this principle, a generic control system could be constructed, for example, using a 360° symmetric matrix for each of matrices 302–308 (systemic degree of reflectivity would be 360°5, which is a multiple of 360°). Additionally, the first matrix 302 could be a 360° symmetric matrix, with the remaining matrices being 180° symmetric matrices (systemic degree of reflectivity would be 360°+ 180°*4, which is also a multiple of 360°). In short, any combination of matrices with a degree of reflectivity adding up to a multiple of 360° will achieve generic control over the oven.

Figure 3B:
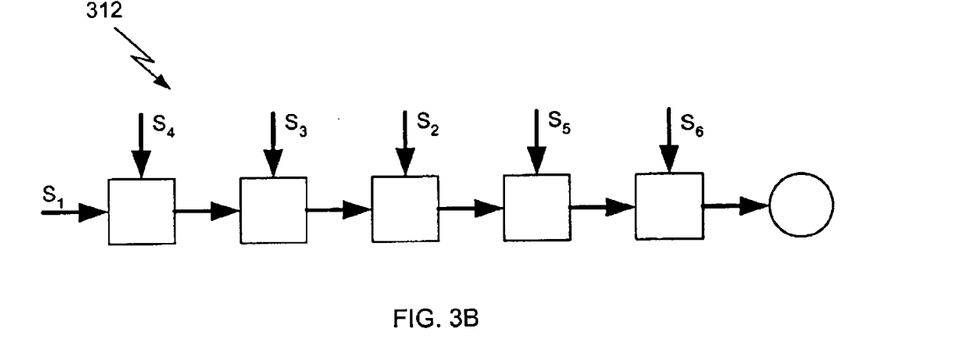
FIG. 3B is a depiction of another matrix-based control system, in accordance with one embodiment of the invention.

FIG. 3B depicts another control system 312, which is equivalent to the control system depicted in FIG. 3A. The control system 312 of FIG. 3B will achieve generic control of the oven, although it inputs the state variables $S_1$–$S_6$ in a different sequence than the sequence depicted in FIG. 3A. Thus, the control strategy herein exhibits the property of commutivity.

To summarize, generic control over the oven can be achieved by: (1) identifying the state variables of the oven; (2) creating a matrix chain segment composed of symmetric matrices, with a systemic degree of symmetry that is a multiple of 360°; and (3) inputting each state variable into the matrix chain segment, without regard to the sequence in which the state variables are inputted into the matrix chain segment. It should be noted that, absent any special insight into the dynamics of the system to be controlled, the matrices composing the matrix chain segment(s) are typically chosen to be flat. However, under certain circumstances, it is desirable to initially select one or more curved, symmetric matrices to populate the matrix chain. For example, if it is suspected that the system under control behaves based upon an exponential function, it may be useful to populate the matrix chain segment(s) with one or more matrices curved so that the cell values therein increase/ decrease bas ed upon an exponential function of their distance from the axis of symmetry.

Figure 3C:
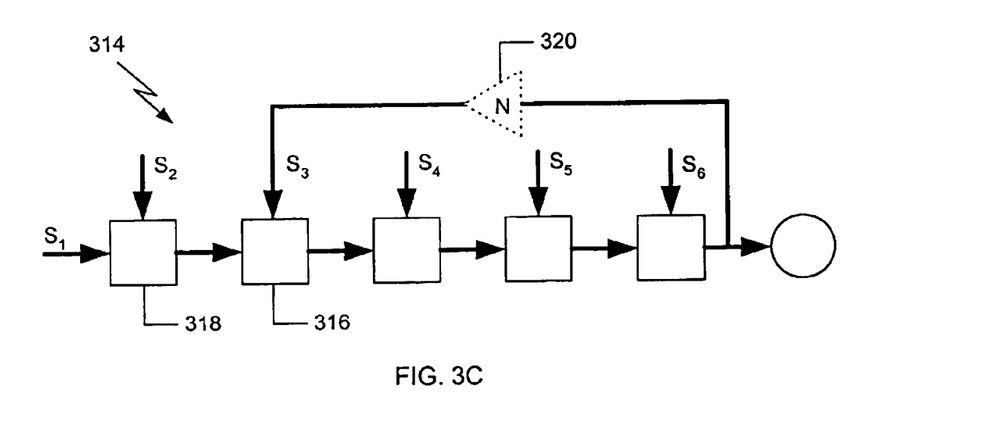
FIG. 3C is a depiction of yet another matrix-based control system, in accordance with one embodiment of the invention.

FIG. 3C illustrates an example of a feedback path being used in a control system 314. As discussed above with reference to FIG. 3A, state variable $S_3$ is the present output of the control system. This variable may be obtained by virtue of feeding the output of the control system back into matrix 316, which requires state variable $S_3$ as an input. As will be discussed below, a control system may employ more than one feedback path, and may optionally have delay elements 320 embedded therein. Notably, if the feedback path were connected to matrix 318, the resulting structure would be useful in pattern recognition and chaos predictors. In fact, the resulting structure would produce one wavelet coefficient.

Figure 4:
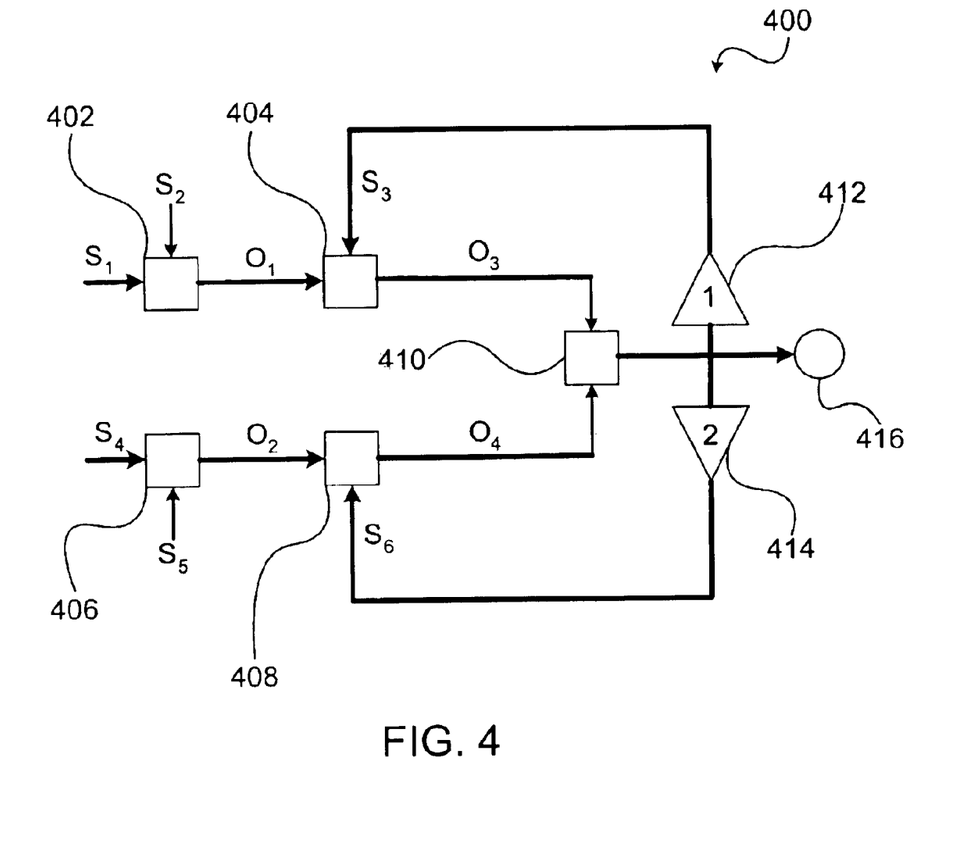
FIG. 4 is a depiction of a matrix-based control system employing time-segregated matrix chain segments, in accordance with one embodiment of the invention.
Figure 6:
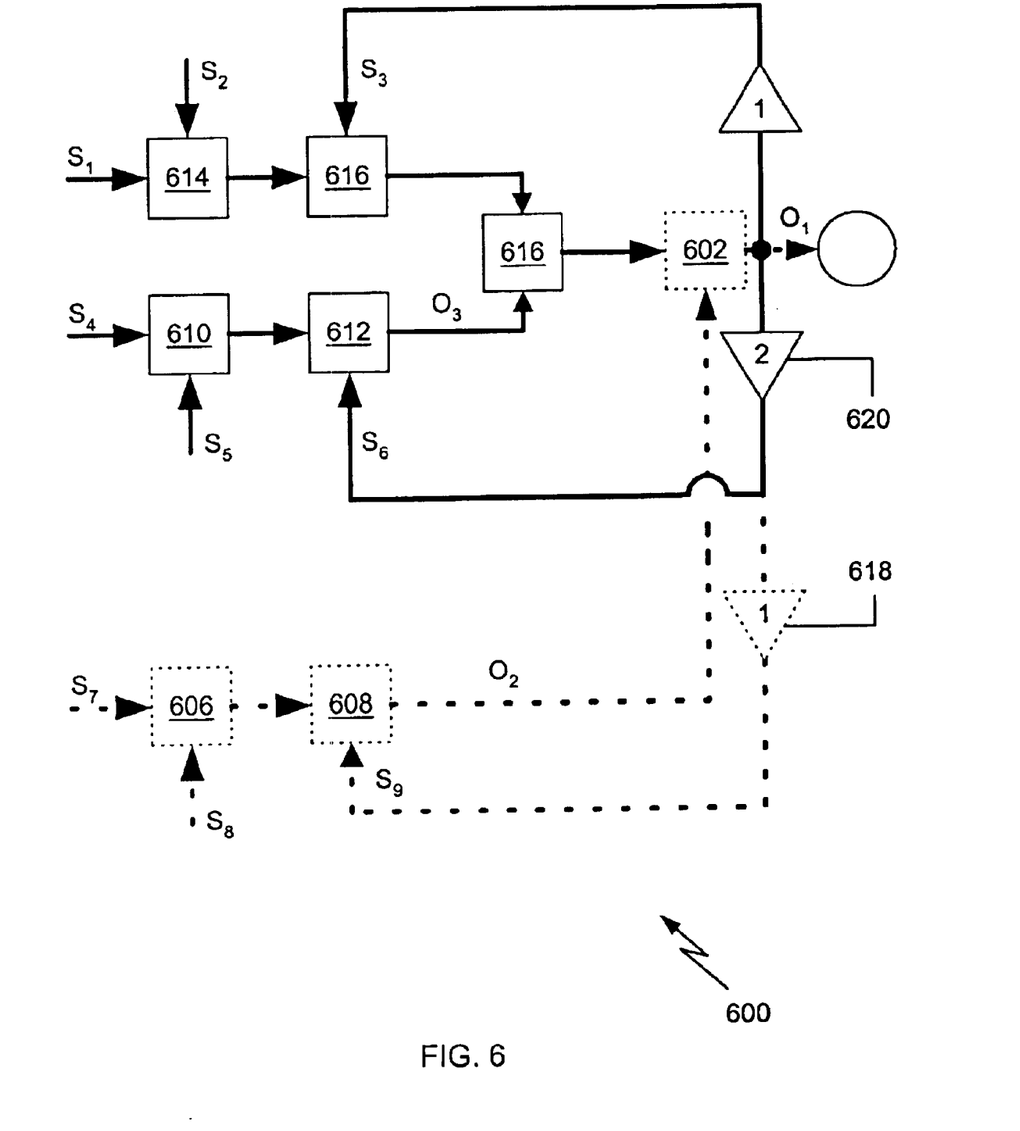
FIG. 6 depicts a first-order matrix based control system that is expanded to achieve higher-order control, in accordance with one embodiment of the invention.
Figure 7:
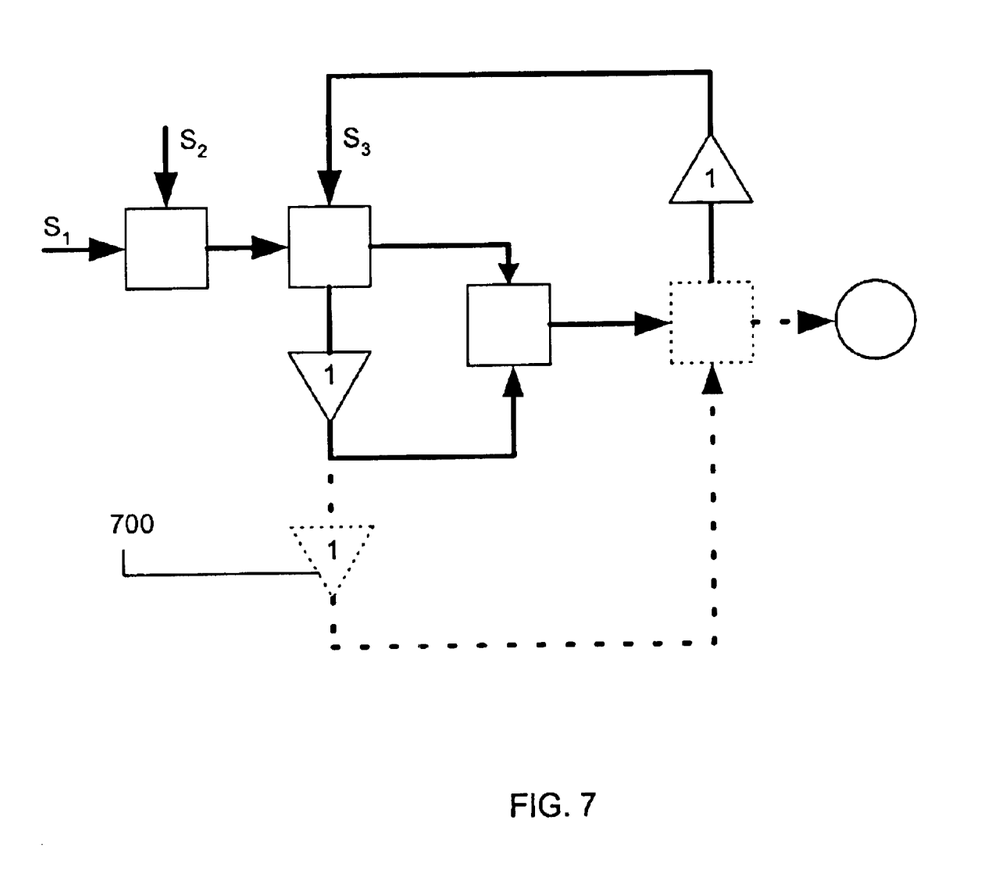
FIG. 7 depicts another first-order matrix based control system that is expanded to achieve higher-order control, in accordance with one embodiment of the invention.

FIG. 4 depicts one example of a modifiable, expandable control system structure 400, which can easily accommodate higher-order control (as will be seen with respect to FIGS.

6 and 7) of the hypothetical oven. As was the case with the control systems depicted in FIGS. 3A–3C, state variables $S_1$–$S_6$ take on the same values: (1) the present oven temperature $S_1$; (2) the present set point $S_2$; (3) the present output $S_3$; (4) the oven temperature during the preceding time interval $S_4$; (5) the set point during the preceding time interval $S_5$; and (6) the output during the preceding time interval $S_6$. Unlike the control systems of FIGS. 3A–3C, the control system 400 of FIG. 4 utilizes two first matrices 402 and 406.

As a consequence of having two first matrices 402 and 406, the control system 400 has two matrix chain segments: (1) matrices 402, 404, and 410; and (2) matrices 406, 408, and 410. The systemic degree of symmetry of each matrix chain segment is a multiple of 360°, meaning that each matrix chain segment serves to drive the oven temperature toward the set point. In this embodiment, the matrix chain segments are segregated by time. Thus, the segment composed of matrices 402, 404, and 410 includes state variable inputs that have been measured at time t=0, while the segment composed of matrices 406, 408, and 410 includes state variable inputs that have been measured at time t=−1. By utilizing the property of time segregation, the control structure becomes easily expandable for higher-order degrees of control. Further, time segregation allows certain matrices to be eliminated altogether.

Looking at the matrix chain segment composed of matrices 402, 404, and 410, it can be seen that matrix 402 receives state variables $S_1$ (temperature at time t=0) and $S_2$ (set point at time t=0) as inputs. The output $O_1$ is provided as an input to matrix 404, which is also provided with state variable $S_3$ (output at time t=0). As can be seen from FIG. 4, state variable $S_3$ is provided by a feedback path originating from the last matrix 410. The feedback path has a delay element 412 embedded in it. The delay element 412 serves to take the output calculated by the control system 400 at time t=−1 (and applied to the heating coil during time t=0), and use it as an input to matrix 404.

The matrix chain segment composed of matrices 406, 408, and 410 operates in a manner similar to the matrix chain segment described above. Matrix 406 receives state variables $S_4$ (temperature at time t=−1) and $S_5$ (set point at time t=−1) as inputs. The output $O_2$ is provided as an input to matrix 408, which is also provided with state variable $S_6$ (output at time t=−1). As described above, state variable $S_6$ is provided by a feedback path originating from the last matrix 410. Again, the feedback path has a delay element 414 embedded in it. The delay element 414 serves to take the output calculated by the control system 400 at time t=−2 (and applied to the heating coil during time t=−1), and use it as an input to matrix 408.

The last matrix 410 receives inputs $O_3$ and $O_4$, which originate as outputs from matrices 404 and 408, respectively. Matrix 410 generates the output $O_5$ that is provided to the heating element 416. Output $O_5$ is also provided to the feedback paths discussed above.

Figure 5:
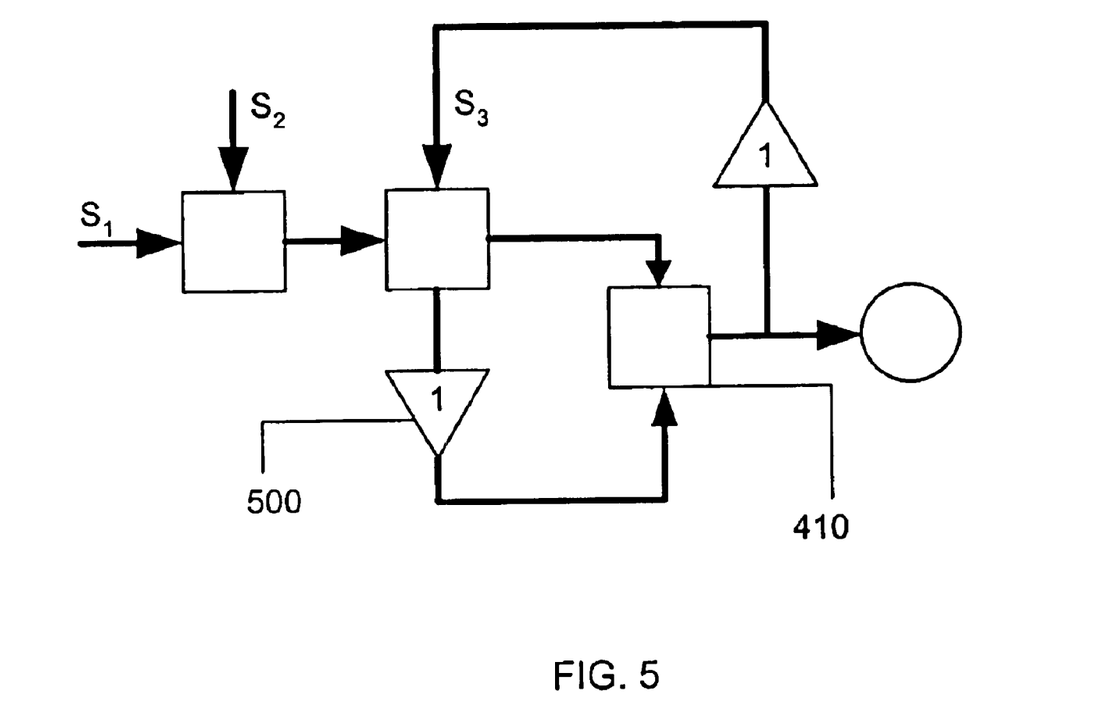
FIG. 5 is a depiction of a matrix-based control system employing a time delay element, in accordance with one embodiment of the invention.

A heretofore undiscussed property of the control system 400 of FIG. 4 is that it exhibits symmetry between the time segregated matrix chain segments. Specifically, with respect to matrices 402 and 406, they are chosen so as to possess identical cell values. Further, the inputs to matrix 406 are the very same inputs utilized by matrix 402, but delayed by one time increment. Therefore, at time t=1, output $O_2$ equals output $O_1$ at time t=0. For the same reasons, at time t=1, output $O_4$ equals output $O_3$ at time t=0. Consequently, matrices 406 and 408 need not be utilized at all. Instead, they can be replaced by a delay element 500 (shown in FIG. 5) that delays the output $O_3$ by one time increment and uses the result as the second input to the last matrix 410. Such a design is depicted in FIG. 5.

The control systems of FIGS. 3A–3C, 4, and 5 are first-order systems. Some systems require a second-order (or higher) control system. FIG. 6 depicts a control system 600 that has been expanded to permit second-order control of the oven. The control system 600 of FIG. 6 utilizes nine state variables $S_1$–$S_9$. The identity of state variables $S_1$–$S_6$ is the same as discussed above with reference to the first-order embodiments: (1) the present oven temperature $S_1$; (2) the present set point $S_2$; (3) the present output $S_3$; (4) the oven temperature during the preceding time interval $S_4$; (5) the set point during the preceding time interval $S_5$; and (6) the output during the preceding time interval $S_6$. The new state variables $S_7$–$S_9$ are: (7) the oven temperature during the time interval t=−2 $S_7$; (5) the set point during the time interval t=−2 $S_8$; and (6) the output during the time interval t=−2 $S_9$.

As can be seen, a first-order system can be turned into a second-order system 600 by adding a new matrix 602 at the end of the first-order system. The new matrix 602 is responsible for generating the output $O_1$ that ultimately drives the heating coil 604, and is therefore the "last matrix" of the second-order system 600. Additionally, matrices 606 and 608 are added to the system 600, thereby creating a third time-segregated matrix chain segment (composed of matrices 606, 608, and 602). Matrices 606 and 608 have cell values that are identical to matrices 610 and 612, respectively (which, in turn, are identical to the cell values of matrices 614 and 616, respectively). State variables $S_7$, $S_8$, and $S_9$ are identical to state variables $S_4$, $S_5$, and $S_6$, except they are delayed by one time increment. State variable $S_9$ (output at time t=−2) may be arrived at by adding an additional time-delay element 618 in series with the pre-existing time delay element 620 used to generate state variable $S_6$ for matrix 612. As a consequence of the foregoing, output $O_2$ is identical to output $O_3$, except it is delayed by one time increment. Output $O_2$ is used as an input to the newly-added last matrix 602, thereby contributing to the output $O_1$, which is used to drive the heating element 604.

In summary, the basic control structure depicted in FIG. 4 can be expanded to a higher-order control system, by adding one or more time-segregated matrix chain segments (such as the segment composed of matrices 606 and 608, and 602), shifting the inputs of the existing delay elements to the newly-added last matrix 602, and adding an additional delay element 618 to feed the new matrix chain segment.

By virtue of the symmetry between matrices 606 and 608 and matrices 610 and 612, matrices 606 and 608 may be supplanted by a delay element 700 (depicted in FIG. 7). The principle upon which this substitution can be made is identical to the principle discussed with reference to FIG. 5. The resulting control structure is depicted in FIG. 7.

Heretofore, the discussion regarding the control structures has assumed that the matrices therein are symmetrical, and contain cell values that do not change. This need not be the case. Typically, the matrices are chosen to be initially symmetric. However, a learning algorithm may be employed, whereupon certain the cell values within matrices are altered so as to introduce asymmetries tailored to the dynamics of the specific system that is being controlled.

Generally speaking, a learning algorithm functions by observing the effects of past outputs of the control device (e.g., observing the effect of running the heating coil during one or more preceding time intervals), and altering one or more matrices so as to reflect the systemic dynamics unearthed via such observation. For example, returning the reader's attention to FIG. 4, matrices 404 and 408 may be re-mapped to learn the oven's dynamics by use of the following procedure. With respect to matrix 404, during a particular time interval, inputs $O_1$ and $S_3$ are used to identify a cell therein; the cell value is outputted to matrix 410. After outputting the cell value to matrix 410, the cell value is altered to be equal to the value taken on by input $O_1$ during the preceding time interval. Similarly, with respect to matrix 408, inputs $O_2$ and $S_6$ are used to identify a cell therein; the cell value is also outputted to matrix 410. After outputting the cell value to matrix 410, the cell value is altered to be equal to the value taken on by input $O_2$ during the preceding time interval. This process effectively tailors matrices 404 and 408 to the dynamics of the oven.

The above-described process can, of course, be used to tailor a control system to the dynamics of any system. Notably, the above-described scheme is best employed upon the first matrix in a matrix chain segment that receives an input predicated upon the process variable (e.g., oven temperature) and the set point (desired oven temperature).

Figure 8:
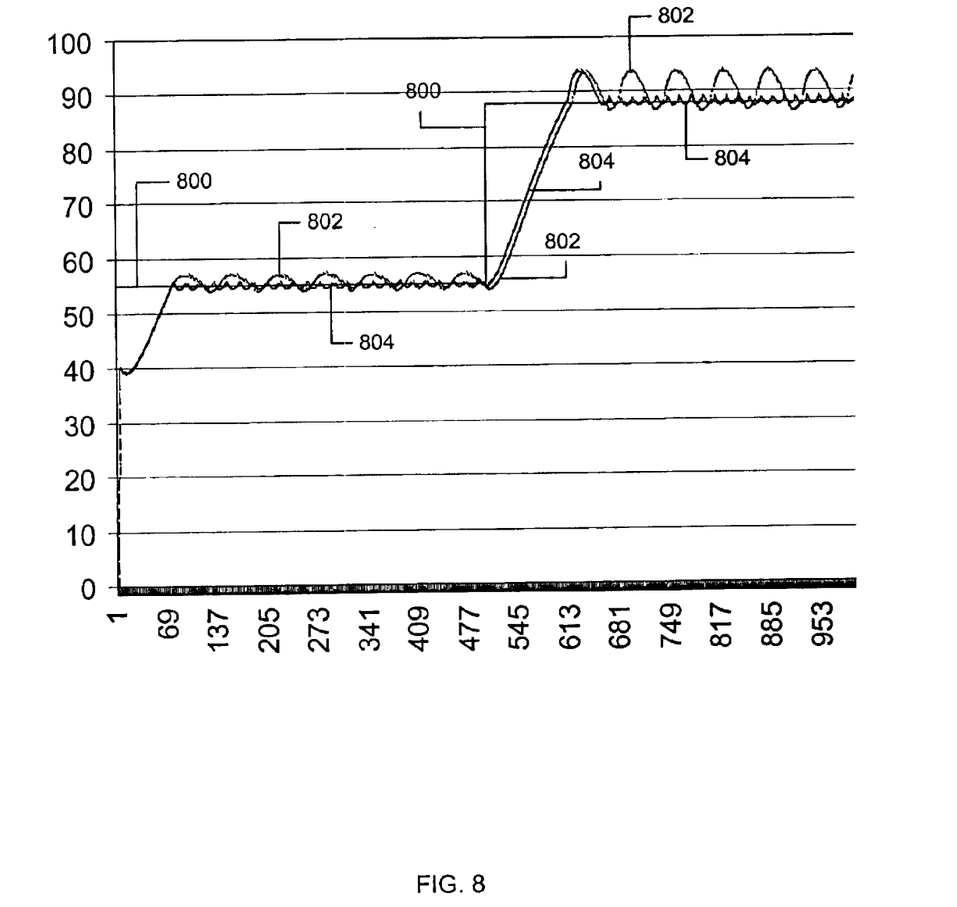
FIG. 8 depicts a comparison between a "bang—bang" control system, and a matrix-based control system that employs a learning algorithm.

FIG. 8 depicts a comparison between a "bang—bang" control system and the matrix-based control system of FIG. 4, wherein the above-described learning algorithm is employed. The data from which FIG. 8 is constructed results from simulating oven response based upon Newton's law of cooling. The bang—bang control method (against which the system of FIG. 4 is compared) operates as follows: if the oven temperature falls below the set point, the heating element is turned on, otherwise the element is turned off. The control system of FIG. 4 also maintains control over oven temperature by simply turning the heating element on and off-it produces superior results by turning the element on and off in a more intelligent manner.

As can be seen from FIG. 8, the oven set point 800 is initially set at 55° and is subsequently set to 88°. Thus, the oven temperature, which begins at 0', is to be controlled to reach and settle at 55°, until the set point jumps to 88°, whereupon the oven temperature is to reach and settle at 88°. The oven temperature resulting from bang—bang control is depicted by line 802. As can be seen from line 802, the bang—bang system of control results in a relatively large oscillation about the set point 800. The average error due to such a scheme of control is 4.55°. However, the matrix-based control result, identified by line 804, is much better. Matrix based control results in a much smaller oscillation about the set point 800. The average error due to this scheme is only 3.20°, a reduction in error of 29.5%.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, other matrices exhibiting symmetry may be employed. Additionally, other asymmetric matrices may also be employed. Furthermore, additional learning algorithms may also be employed. Numerous other changes may be made which will readily suggest themselves to those skilled in the art and which are encompassed in the invention disclosed and as defined in the appended claims.

The claimed invention is:

1. A method of controlling a system having a plurality of state variables, so as to drive a process variable to a set point, the method comprising:

(i) establishing a matrix chain comprised of a plurality of matrices, including a first matrix, at least one intermediate matrix, and a last matrix;

wherein, each matrix generates an output based upon a plurality of inputs;

wherein the inputs for the first matrix are state variables;

wherein, for the at least one intermediate matrix, one input is the output from another matrix and another input is either a state variable or the output from another matrix;

wherein, for the last matrix, at least one input is the output from another matrix, and the output of the last matrix is used to drive a control device that influences the process variable, and is further used as an input to either the first matrix or at least one intermediate matrix;

wherein, the matrix chain initially exhibits a degree of reflectivity that is a multiple of 360°;

(ii) while controlling the system, inputting the state variables to the plurality of matrices; and (iii) while controlling the system, driving the control device with the output of the last matrix.

2. The method of claim 1, wherein each of the matrices in the matrix chain are symmetric.

3. The method of claim 2, wherein each of the matrices in the matrix chain are flat.

4. The method of claim 2, wherein at least one of the matrices in the matrix chain are curved.

5. The method of claim 1, wherein at least one of the matrices in the matrix chain is asymmetric.

6. The method of claim 1, wherein the matrix chain includes both symmetric and asymmetric matrices.

7. The method of claim 6, wherein the symmetric matrices include both flat and curved matrices.

8. The method of claim 1, wherein at least one intermediate matrix is selected for alteration based upon at least one past input to the selected matrix.

9. The method of claim 8, wherein at least one cell in the selected matrix is altered to contain a past input to the selected matrix.

10. The method of claim 9, wherein at least one cell in the selected matrix is altered to contain an input from an immediately preceding time epoch.

11. The method of claim 9, wherein, during a present time epoch, at least one cell in the selected matrix is altered to contain an input from a time epoch occurring more than one time epoch in advance of the present time epoch.

12. An apparatus for controlling a system having a plurality of state variables, so as to drive a process variable to a set point, the apparatus comprising:

a processor;

a control device that performs a physical function that influences the process variable, the control device being controlled directly or indirectly by the processor; and a memory unit operably coupled to the processor, the memory unit containing instructions to perform the following steps (i) establish a matrix chain comprised of a plurality of matrices, including a first matrix, at least one intermediate matrix, and a last matrix;

wherein, each matrix generates an output based upon a plurality of inputs;

wherein the inputs for the first matrix are state variables;

wherein, for the at least one intermediate matrix, one input is the output from another matrix and another input is either a state variable or the output from another matrix;

wherein, for the last matrix, at least one input is the output from another matrix, and the output of the last matrix is used to drive the control device, and is further used as an input to either the first matrix or at least one intermediate matrix;

wherein, the matrix chain initially exhibits a degree of reflectivity that is a multiple of 360°;

(ii) while controlling the system, input the state variables to the plurality of matrices; and (iii) while controlling the system, drive the control device with the output of the last matrix.

13. The apparatus of claim 12, wherein each of the matrices in the matrix chain are symmetric.

14. The apparatus of claim 13, wherein each of the matrices in the matrix chain are flat.

15. The apparatus of claim 13, wherein at least one of the matrices in the matrix chain are curved.

16. The apparatus of claim 12, wherein at least one of the matrices in the matrix chain is asymmetric.

17. The apparatus of claim 12, wherein the matrix chain includes both symmetric and asymmetric matrices.

18. The apparatus of claim 17, wherein the symmetric matrices include both flat and curved matrices.

19. The apparatus of claim 12, wherein at least one intermediate matrix is selected for alteration based upon at least one past input to the selected matrix.

20. The apparatus of claim 19, wherein at least one cell in the selected matrix is altered to contain a past input to the selected matrix.

21. The apparatus of claim 20, wherein at least one cell in the selected matrix is altered to contain an input from an immediately preceding time epoch.

22. The apparatus of claim 20, wherein, during a present time epoch, at least one cell in the selected matrix is altered to contain an input from a time epoch occurring more than one time epoch in advance of the present time epoch.

23. A method of controlling a system having a plurality of state variables, so as to drive a process variable to a set point, the method comprising:

detecting the state variables of the system;

inputting the set of state variables to a matrix chain, wherein the matrix chain is comprised of a plurality of matrices in which an output from one matrix in the chain is an input to a second matrix in the chain, wherein at least one of the matrices initially exhibits symmetry, and wherein at least one matrix feeds its output to a rearward matrix of the matrix chain; and driving a control device that influences the process variable with the output of one of the matrices in the matrix chain.

24. The method of claim 23, wherein the matrices are flat.

25. The method of claim 23, wherein the matrices are curved.

26. The method of claim 23, wherein at least one matrix exhibits asymmetry.

27. The method of claim 23, wherein at least one of the matrices is selected for alteration based upon at least one past input to the selected matrix.

28. The method of claim 27, wherein at least one cell in the selected matrix is altered to contain a past input to the selected matrix.

29. The method of claim 28, wherein at least one cell in the selected matrix is altered to contain an input from an immediately preceding time epoch.

30. An apparatus for controlling a system having a plurality of state variables, so as to drive a process variable to a set point, the apparatus comprising:

a processor;

a control device that performs a physical function that influences the process variable, the control device being controlled directly or indirectly by the processor; and a memory unit operably coupled to the processor, the memory unit containing instructions to perform the following steps receive the state variables of the system;

input the set of state variables to a matrix chain, wherein the matrix chain is comprised of a plurality of matrices in which an output from one matrix in the chain is an input to a second matrix in the chain, wherein at least one of the matrices initially exhibits symmetry, and wherein at least one matrix feeds its output to a rearward matrix of the matrix chain; and drive a control device that influences the process variable with the output of one of the matrices in the matrix chain.

31. The apparatus of claim 30, wherein the matrices are flat.

32. The apparatus of claim 30, wherein the matrices are curved.

33. The apparatus of claim 30, wherein at least one matrix exhibits asymmetry.

34. The apparatus of claim 30, wherein at least one of the matrices is selected for alteration based upon at least one past input to the selected matrix.

35. The apparatus of claim 34, wherein at least one cell in the selected matrix is altered to contain a past input to the selected matrix.

36. The apparatus of claim 35, wherein at least one cell in the selected matrix is altered to contain an input from an immediately preceding time epoch.

37. An integrated circuit including an arrangement of logic gates for exerting control over a system having a plurality of state variables, so as to drive a process variable to a set point, the integrated circuit being configured and arranged to perform the following steps:

receive the state variables of the system;

input the set of state variables to a matrix chain, wherein the matrix chain is comprised of a plurality of matrices in which an output from one matrix in the chain is an input to a second matrix in the chain, wherein at least one of the matrices initially exhibits symmetry, and wherein at least one matrix feeds its output to a rearward matrix of the matrix chain; and drive a control device that influences the process variable with the output of one of the matrices in the matrix chain.

38. The integrated circuit of claim 37, wherein the matrices are flat.

39. The integrated circuit of claim 37, wherein the matrices are curved.

40. The integrated circuit of claim 37, wherein at least one matrix exhibits asymmetry.

41. The integrated circuit of claim 37, wherein at least one of the matrices is selected for alteration based upon at least one past input to the selected matrix.

42. The integrated circuit of claim 41, wherein at least one cell in the selected matrix is altered to contain a past input to the selected matrix.

43. The integrated circuit of claim 42, wherein at least one cell in the selected matrix is altered to contain an input from an immediately preceding time epoch.

* * * * *